June 4, 1968 D. R. WILLISTON 3,387,103
GUIDE FOR CONTACTING SHOE ON ELECTRICALLY DRIVEN CARS
Filed July 13, 1965 3 Sheets-Sheet 1

INVENTOR
DOUGLAS R. WILLISTON
BY
Fetherstonhaugh & Co.
ATTORNEYS

June 4, 1968   D. R. WILLISTON   3,387,103
GUIDE FOR CONTACTING SHOE ON ELECTRICALLY DRIVEN CARS
Filed July 13, 1965   3 Sheets-Sheet 2

INVENTOR
DOUGLAS R. WILLISTON
BY
Fetherstonhaugh & Co.
ATTORNEYS

United States Patent Office 3,387,103
Patented June 4, 1968

3,387,103
GUIDE FOR CONTACTING SHOE ON ELECTRICALLY DRIVEN CARS
Douglas R. Williston, 4605 Arthur Drive,
Ladner, British Columbia, Canada
Filed July 13, 1965, Ser. No. 471,553
Claims priority, application Canada, July 17, 1964,
907,526
4 Claims. (Cl. 191—83)

ABSTRACT OF THE DISCLOSURE

A guide arrangement for the contacting shoe of an electric car trolley and having abutment members movably mounted on and normally projecting laterally from a trolley head and relative to a conductor engaged by the shoe, and means connected to said members and operable when the shoe becomes disengaged from the conductor to shift the members out of their normal positions into positions on opposite sides of the conductor to guide the shoe back into engagement with said conductor.

---

This invention relates to electrically driven cars commonly known as trolley cars and more specifically to contact-shoes for providing mobile connection between trolley lines and the driven cars.

The trolley or contacting shoes used until the present on underground electrically driven locomotives or surface tramway cars are subject to skipping due to irregular switches or obstructions on the trolley line, thus breaking the circuit. The operator is then required to re-establish contact by manually realigning the trolley supporting arm in order to replace the shoe on the power transmission line, thus causing considerable delay.

The present invention is characterized in that guide arms are provided on each side of the trolley for the purpose of automatically replacing the contacting shoe on the trolley line after the shoe is caused to skip or derail. Another purpose of the invention is to keep the circuit from breaking throughout the operation. Accordingly, as the shoe is derailed, the guide arms which are normally in a lowered position, are immediately activated upon contact with the power line and spring upwardly forcing the trolley to renew its operating contact with the power line.

Basically the invention consists of a trolley adapted to be slidably associated with a power line or bar. The trolley is mounted on a trolley pole or other means adapted to resiliently hold the trolley against the line or bar. Guide arms are movably mounted on each side of the trolley head so as to extend outwardly at each side. The guide arms may be vertically reciprocally mounted in grooves provided in each side of the trolley head although in the embodiments illustrated in the drawings these arms are pivoted on each side of the trolley head so as to extend outwardly from each side thereof. Push rods are articulated at an advantageous leverage point on the guide arms and are moved for up and down movement by means inside the trolley which are responsive to a trolley derailment, thus activating the push rods and causing the guide arms to pivot upwardly thereby guiding the trolley back into operative association with the power line.

Having thus generally described the nature of the invention, particular reference will be made to the accompanying drawings illustrating a preferred embodiment thereof, and in which.

Figure 1:
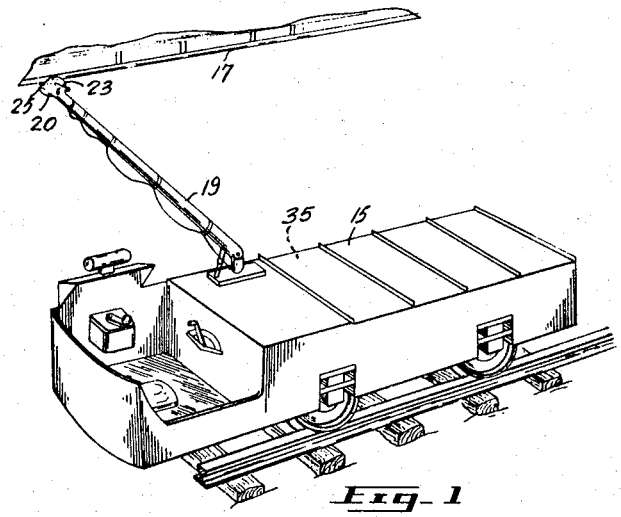
FIGURE 1 is a perspective view of an underground electric locomotive having a trolley arrangement in accordance with the present invention.
Figure 2:
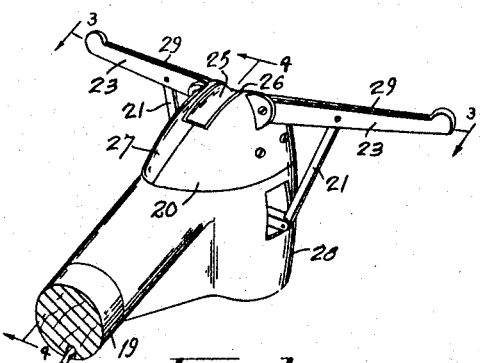
FIGURE 2 is a perspective view of a preferred embodiment of the invention.
Figure 3:
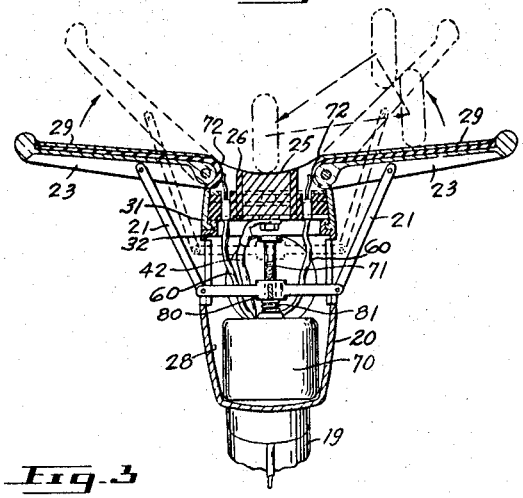
FIGURE 3 is a vertical cross-section taken along line 3—3 of FIGURE 2.
Figure 4:
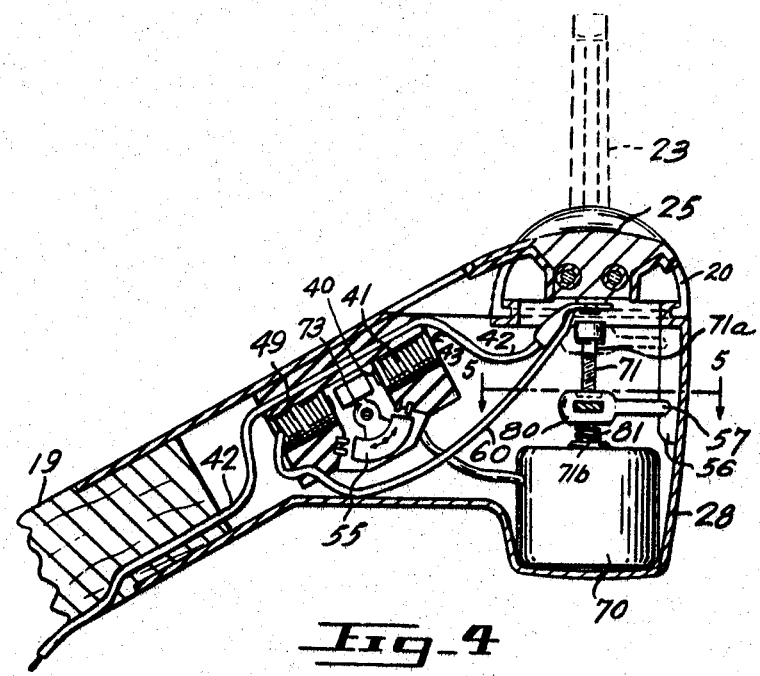
FIGURE 4 is an enlarged vertical cross-section taken along line 4—4 of FIGURE 2.
Figure 5:
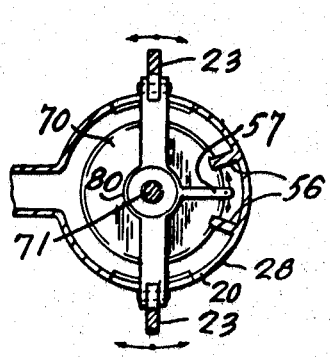
FIGURE 5 is a cross-section on line 5—5 of FIGURE 4.

The invention in a more specific sense deals with a trolley 20 mounted on the upper end of a trolley arm 19 which is spring biased to an electric locomotive 15 including an electric motor 35. Electrical current, either A.C. or D.C., is conducted along a power rail or line 17.

The trolley 20 is in constant contact with the rail 17 thus conducting the current from the line 17 to the motor 35 in the locomotive 15.

A preferred form of trolley 20 is shown in FIGURES 2 to 5. A trolley 20 consists of a trolley head 27 connected to a trolley body 28. The trolley head 27 is connected to the trolley body by means of an annular flange 31 fitting in a recess 32, see FIGURE 3. This arrangement permits a slight rotation of the head 27 relative to the body 28, thus allowing for some horizontal play in situations such as when the trolley is pulled around a curve.

A graphite shoe 25 or wheel is maintained in contact with the rail 17. This shoe 25 is fitted in an insulated seat 26. Guide arms 23 are pivotally mounted at inner ends thereof on opposite sides of the trolley head 27 and are operatively connected to a motor 70 within body 28 by push rods 21, thus adapting the guide arms for upward pivotal movement.

The current is conducted from the graphite shoe 25 to the car motor 35 through a main conductor 42. A wire 43 is tapped to the main conductor 42 and is wound about a core 40 of an electromagnet 41. The lead is then properly grounded at 200, see FIGURE 6.

The guide arms 23 are covered on the upper side with a sheet 29 of conductive material which is insulated from the metallic guide arms. A connector 72 is adapted to be in contact with each conductor 29. A lead wire 60 extends from each connector 72 to a core 49 where it is wound in such a way as to give the coil 49 an electromagnet property, said lead being grounded at 201. This coil 49 is axially displaced from the coil 41 and a pivoted switch 73 is situated between the two coils.

Figure 6:
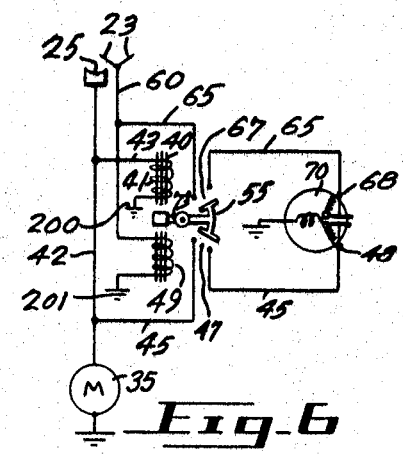
FIGURE 6 is a schematic diagram showing a preferred circuit used in the embodiment in FIGURE 2.

Leads 65 and 45 tapped to the conductors 60 and 42 respectively extend to opposite terminals 68 and 48 of the reversible split phase motor 70, see FIGURE 6. The leads 65 and 45 are interrupted and require a contactor 55 to complete the circuit. The gaps 67 and 47 in leads 65 and 45 respectively are alternately closed by contactor 55 which is in turn actuated by pivot switch 73.

The reversible split phase motor 70 has a threaded shaft 71 which is threaded through a cross arm 80, to the ends of which push rods 21 are pivotally connected. The ends of cross arm 80 project outwardly through openings in body 28. The threaded shaft 71 is formed with smaller diameter sections 71a and 71b at the top end and bottom ends thereof respectively. When cross arm 80 reaches either reduced portion 71a or 71b it ceases to be engaged by the threads of the shaft, thus limiting its axial movement.

Guiding the up and down movement of the push rods 21 and also limiting the amount of horizontal play the trolley head 27 should have relative to the trolley body 28, is a guide arm 57 projecting from cross arm 80 and moving within the two vertical restricting shoulders 56. These shoulders could be parallel but preferably they should be inclined toward each other, thus gradually limiting the amount of horizontal rotation of the trolley head 27 as the guide arms are raised, preventing any damage. Furthermore, arm 57 would restrict any further upward movement by the push rods once it reaches the apex formed by the two inclined shoulders.

OPERATION

Accordingly, when the power rail 17 is in contact with the graphite shoe 25, the current is conducted down the main lead 42 to the motor 35. Some of the current is bypassed through the wire 43 and around the coil 41 to the ground 200, thus causing an electromagnetic field relative to the coil 41.

The electromagnet 41 now attracts switch 73 which in turn causes contactor 55 to complete the circuit at gap 47, letting the current from the main wire 42 enter the reversing motor 70 by means of lead 45.

This causes the shaft to turn in a counter-clockwise direction forcing cross arm 80 to bear down on spring 81 on the lower end of shaft 71 and therefore the guide arms 23 are kept at their lowest position.

In the event that the contact shoe 25 derails from the power rail 17, the guide arms will come into contact with the power rail 17. In this case the current is halted in the line 42 and coil 41. The current now comes through the conductive sheets 29 to the wire 60, which in turn carries the current through the coil 49 activating its electromagnetic properties and thus attracting the switch 73 thus completing the circuit at 67 by means of contactor 55. The current can now enter the reversible motor 70 at terminal 68. This causes the shaft to rotate clockwise, making the threads engage the cross arm 80, and thus raising the push rods and forcing the guide arms to rise and to shift the trolley laterally thus re-establishing contact with the rail 17.

Figure 7:
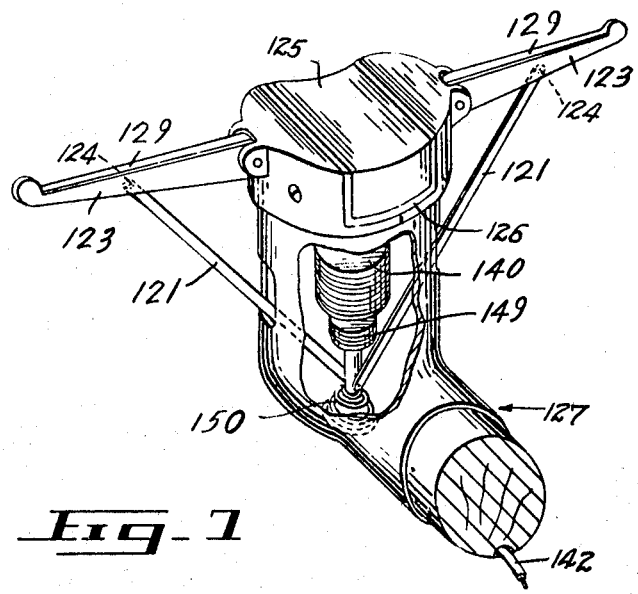
FIGURE 7 is a perspective view of another embodiment of the invention.
Figure 8:
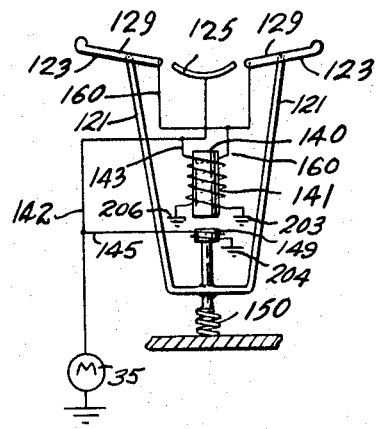
FIGURE 8 is a schematic diagram showing the particular circuit used in FIGURE 7.

Alternatively as shown in FIGURES 7 and 8 another circuit may be established which actuates the trolley guide arms in a similar manner.

With the use of a reversible electromagnet 141 an axially aligned electromagnetized plunger 149 may be adapted to move push rods 121 in an up and down movement. A graphite shoe 125 is fitted in the insulated seat 126 cut out of trolley head 127. Guide arms 123 pivoted on each side of the trolley head are adapted to move up and down by means of the push rods 121 which are articulated at 124. A conductive material 129 is placed in the upper side of the guide arms 123 and, it is insulated from the guide arms by an insulated material placed between the conductive sheet 129 and the metallic guide arms 123.

A main conductor 142 is connected to the graphite shoe 125 and carries the A.C. or D.C. current from the shoe to the motor in the locomotive. A lead 143 carries some of the current around the core 140 and the lead is wound in such a way as to form an electromagnetic polarity wherein the S pole is downward and the N pole is upward relative to the coil 141. The lead is then connected to a proper ground 203. Directly below the coil 141 is a plunger 149. A lead 145 is also taken from the main conductor 142 and coiled around the metallic plunger 149 electromagnetizing it in such a way as to cause the S pole to be upward and the N pole downward. Lead 145 is grounded at 204. It can be seen that as a current is fed through the main power line through the graphite shoe down to the motor, an electromagnetic field of similar poles is created between the fixed coil 141 and the plunger 149, thus forcing the plunger 149 downward from the coil, and as a result the guide arms 123 remain in their lowest position.

A lead 160 is established from the conductors 129 and is wound around the fixed coil 141 in an opposite manner relative to the winding 143 and then it is led to the ground 206. The opposite winding causes a reversal in the poles thus the N pole is now downward and the S pole is naturally upward. Therefore, when the power rail or line is in contact with the conductor on the guide arms, the current is non-existent in the main conductor 142, but it is now led through the lead wire 160 reversing the normal polarity of the coil, thus attracting the plunger upward with the help of spring 150 and causing the guide arms to move upward forcing the trolley head back to the power rail, and re-establishing a normal current through the conductor 142 to the motor 35.

Other variations can be made based on the embodiment shown in FIGURES 7 and 8. For instance, lead wire 160 may bypass coil 141 and carry the current to the motor, while a certain amount of current is tapped from the line 160 through the coil 141. In this way, there would be no interruption of current to the motor.

In still another example, the conductor 129 and lead 160 can be deleted completely, wherein the spring 150 will work against the opposed polarity between the plunger and the fixed coil. In the event that the trolley head may derail from the power rail or line the circuit will be cut off completely thus destroying the magnetic field working against the spring 150. In this case, the spring 150 will be allowed to move raising the guide arms.

What I claim as my invention is:

1. An apparatus for automatically re-establishing contact between a contact shoe and an elongated contact member connected to an electrical source means for driving electrically driven cars, comprising, in combination with a contact shoe supported in a trolley head body and normally resiliently biased towards said contact member; a pair of abutment members extending substantially horizontally outwardly one at each side of said trolley head body adapted to reciprocal movement from a normal non-operative first position wherein said abutment members are in a position clear of said contact member to a second guiding position wherein said abutment members ares in a position departing sufficiently from the horizontal position to abut said contact member at either side, and means connected to said abutment members responsive to a disnegagement of said contact shoe from said contact member under operative conditions to actuate said abutment members from said first position to said second position in order to guide said contact shoe back to its normal contact position, and means for returning said abutment members to said first non-operative position when said shoe is in its normal contacting position, said actuating means comprising a reversible electromagnet axially fixed to said head and a movable electromagnet in axial alignment but spaced from said reversible electromagnet, connecting members connected to said movable electromagnet at one end and to said abutment members at the other end, said fixed electromagnet normally repulsing said movable electromagnet when said contact shoe is associated with said contact member thus holding said abutment members in said first position, and said reversing electromagnet attracting said movable magnet when said contact shoe becomes separated from said contact member, thus moving the abutment members into said second position.

2. An apparatus as defined in claim 1 wherein said actuating means comprises a first electromagnet axially fixed to said trolley head and a second electromagnet axially movable relative to said first electromagnet, said second electromagnet being resiliently urged towards said first electromagnet, said movable electromagnet being normally repulsed by said first magnet, overcoming said spring when said contact shoe is associated with said contact member, and said resiliently urged electromagnet being displaced toward said first magnet when said contact shoe is disengaged from said contact member thus causing said abutment members to move from said first position to said second position.

3. An apparatus for automatically re-establishing contact between a contact shoe and an elongated contact member connected to an electrical source means for driving electrically driven cars comprising in combination with a contact shoe supported in a trolley head normally resiliently biased towards said contact member, a pair of guiding arms, one of said pair being pivotally mounted on each side of said head for swinging reciprocal movement from a normal non-operative first position wherein said guide arms are in substantially horizontal position clear of said contact member to a second guiding position wherein said guide arms are in a position departing sufficiently from said horizontal position to abut said elongated contact member at either side, and electrosensitive means adapted with said guide arms to respond to a disengagement of said shoe with said elongated contact member by raising said guide arms to said second position for guiding said shoe back to its normal contact position and subsequent electrosensitive means for lowering said guide arms to said first position upon re-establishing contact between said contact shoe and said elongated contact member.

4. An apparatus for automatically re-establishing contact between a contact shoe and an elongated contact member to an electrical source means for driving electrically driven cars comprising in combination with a contact shoe supported in a trolley head normally biased towards said contact member, guide arms extending outwardly at each side of said trolley head and being pivotally mounted to said trolley for swinging reciprocal movement from a normal non-operative first position wherein said guide arms are in a substantially horizontal position clear of said contact member to a second guiding position wherein said guide arms are in a position departing sufficiently from said horizontal position to abut said contact member at either side, a first electromagnet associated with a second electromagnet for controlling current to a reversible drive means having a substantially upright threaded reversible shaft, a pair of connecting members connecting said guide arms to said shaft for threadable engagement therewith and adapted to engage said connecting members for up and down movement thereby moving said guide arms between said first and second positions.

References Cited

UNITED STATES PATENTS

| | | | |
|---|---|---|---|
| 450,489 | 4/1891 | Jackson et al. | 191—83 |
| 940,718 | 11/1909 | Parker | 191—72 |
| 1,662,233 | 3/1928 | Brown | 191—83 X |

ARTHUR L. LA POINT, *Primary Examiner.*

S. T. KRAWCZEWICZ, *Assistant Examiner.*